Nov. 1, 1955     I. R. HAVENS     2,722,235
VALVE
Filed Feb. 15, 1952     2 Sheets-Sheet 1
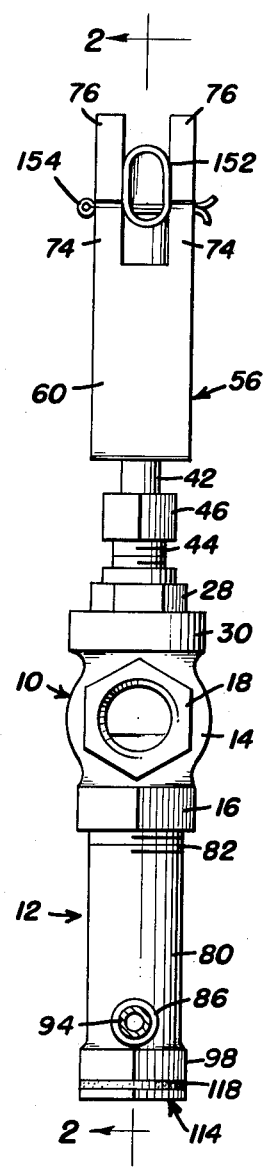
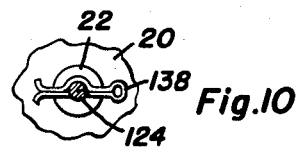
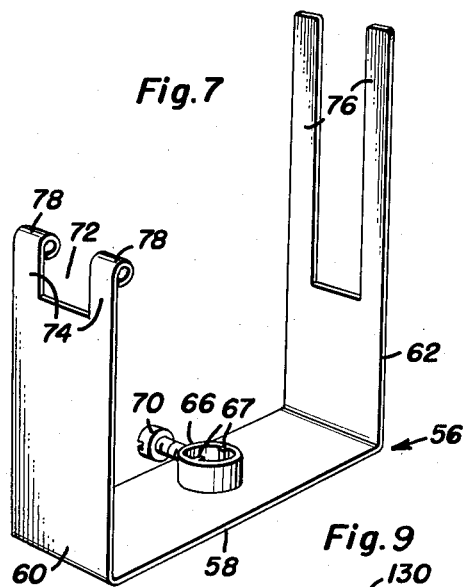
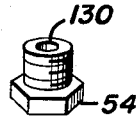
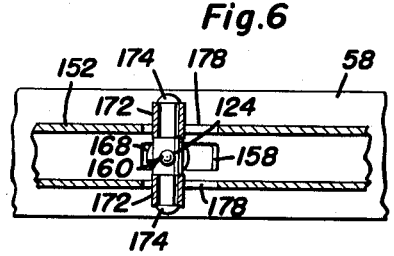
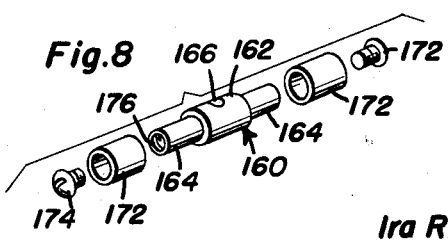
Ira R. Havens
INVENTOR.

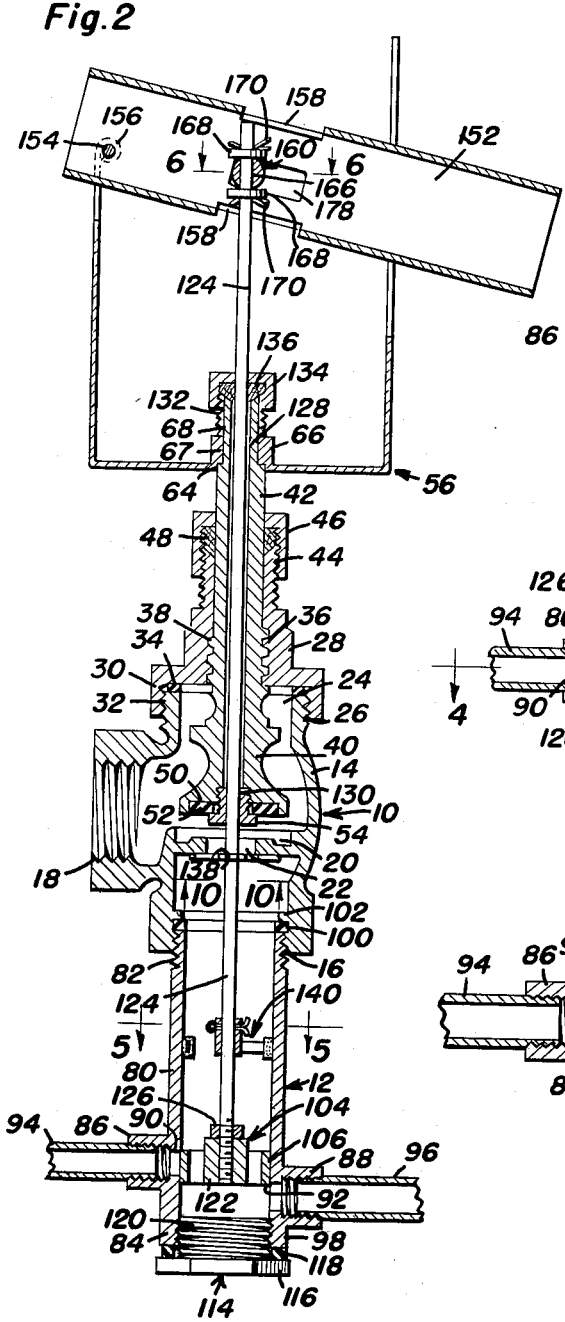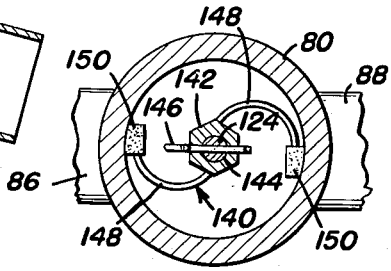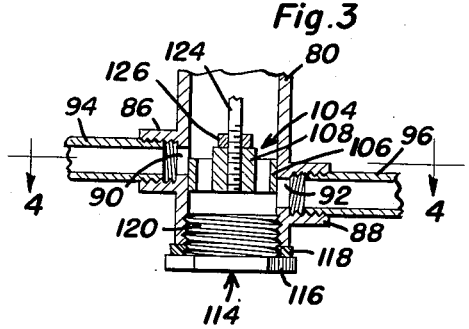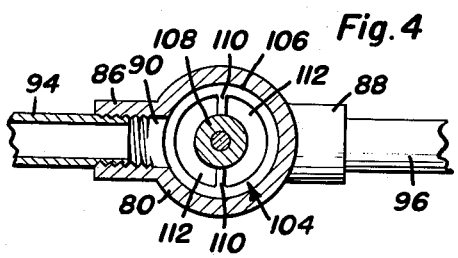

United States Patent Office 2,722,235
Patented Nov. 1, 1955

2,722,235

VALVE

Ira R. Havens, Rolla, Mo.

Application February 15, 1952, Serial No. 271,791

6 Claims. (Cl. 137—637.4)

This invention relates in general to valve structures, and more specifically to a valve for mixing hot and cold water to produce a stream of water of the desired temperature.

The primary object of this invention is to provide an improved mixing valve adapted for use in showers and the like, said mixing valve having means for regulating the flow of hot and cold water in order to produce a flow of water of the desired temperature.

Another object of this invention is to provide an improved valve structure in the form of a combined shut-off valve and mixing valve.

Another object of this invention is to provide an improved combination shut-off and mixing valve, said valve structures being independently operated whereby the rate of flow may be regulated independently of the temperature of the water flowing from the valve.

Another object of this invention is to provide an improved valve structure which includes shut-off valve means and mixing valve means, the operating stems for the two said valves being co-axial with the valve stem for the mixing valve extending through and being rotatable independently of the valve stem for the shut-off valve.

Another object of this invention is to provide an improved combination mixing and shut-off valve which is of extremely simple construction and compact in design whereby it may be economically manufactured.

Another object of this invention is to provide an improved control means for a combined shut-off and mixing valve, said control means being combined in a single handle.

A further object of this invention is to provide an improved combination mixing valve and shut-off valve wherein said mixing valve may be formed in a separate unit and combined with a conventional shut-off valve by merely modifying the valve stem thereof.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this specification, and in which:

Figure 1 is a front elevational view of the combined shut-off and mixing valve, which is the subject of this invention, said valve including a separate shut-off chamber and a separate mixing chamber with the control means for the two chambers being positioned above said chambers and combined in one unit;

Figure 2 is an enlarged transverse vertical sectional view taken substantially upon the plane indicated by the section line 2—2 of Figure 1 and showing the internal construction of the two valve structures and their control means, the mixing valve means is so positioned as to close the cold water inlet and allow the hot water inlet to be fully opened;

Figure 3 is a fragmentary transverse vertical sectional view similar to the sectional view of Figure 2 and showing only the lower portion of the mixing valve, the movable valve element of the mixing valve being positioned so as to admit both hot and cold water;

Figure 4 is a transverse horizontal sectional view taken substantially upon the plane indicated by the section line 4—4 of Figure 3 and showing the general relationship of the mixing valve element with respect to the mixing valve chamber, the figure also illustrating the general shape of the mixing valve element;

Figure 5 is an enlarged partial transverse horizontal sectional view taken substantially upon the plane of the section line 5—5 of Figure 2 and showing the arrangement of a guide means for supporting the control stem of the mixing valve element intermediate its ends;

Figure 6 is a fragmentary transverse horizontal sectional view taken substantially upon the plane indicated by the section line 6—6 of Figure 2 and showing the general construction of the means for translating pivotal movement to vertical movement for operating the control stem for the mixing valve elements;

Figure 7 is an enlarged perspective view of the control handle for the shut-off valve, the control means for the mixing valve being omitted;

Figure 8 is an enlarged exploded perspective view of the means for connecting the control handle for the mixing valve to the upper ends of the control stem of the mixing valve;

Figure 9 is an enlarged perspective view of a special bolt for retaining the stop valve washer in place on its associated valve elements; and Figure 10 is a fragmentary transverse horizontal sectional view taken substantially upon the plane indicated by the section line 10—10 of Figure 2 and showing the construction and means carried by the control stem of the mixing valve for limiting upward movement thereof.

Similar characters of reference designate similar or identical elements and portions throughout the specification and throughout the different views of the drawings.

Referring now to the accompanying drawings in particular, it will be seen that there is illustrated in Figure 2 a combined stop valve and mixing valve, said combined valve including a stop valve portion referred to in general by the reference numeral 10 and a mixing valve portion referred to in general by the reference numeral 12.

The stop valve portion 10 includes a conventional globe valve housing 14 which has a threaded inlet opening 16 and a threaded outlet opening 18, the outlet opening being at right angles to the inlet opening. Mounted within the inlet opening and extending transversely thereof is a valve seat 20 having an opening 22 therethrough through which inlet water passes. The globe valve housing 14 is also provided with a valve stem opening 24 with that portion of the housing formed in the opening and being extendingly threaded as at 26.

Threadedly engaged with the threads 26 and closing the valve stem opening 24 is a cap member 28. The cap member 28 has a flange portion 30 which is internally threaded as at 32, the internal threads 32 of the flange portion 30 engaging with the external threads 26 of the globe valve housing 14. In order that the cap member 28 may be sealed to the housing 14, an annular packing 34 is disposed between the valve stem outlet end of the housing and the flange portion 30 of the cap member 28 and pressed therebetween.

The cap member 28 is provided with coarse internal threads 36 which are in engagement with threads 38 on the valve element 40 of the stop valve portion 10. Extending upwardly from and integral with the valve element 40 is a valve stem 42 which projects upwardly from the upper end of the cap member 28. In order that the space between the valve stem 42 and the cap member 28 may be sealed, the cap member 28 is threaded at its upper end 44 and has received thereon a packing adjusting nut 46 which clamps packing 48 against the end of the cap member 28 and around the valve stem 42.

In order that the stop valve portion 10 will permit the flow of water through the valve seat opening 22, the valve element 40 is provided at its lower end with a recess 50 in which is seated a washer 52 for engagement with the valve seat 20. The washer 52 is retained within the recess 50 by a special bolt 54 which will be explained in more detail hereinafter.

In order that the valve stem 42 and the valve element 40 may be rotated and moved downwardly by the threads 36 and 38 into engagement with the valve seat 20, the valve stem 42 is provided at its upper end with a control handle which is referred to in general by the reference numeral 56.

Referring now to Figure 7 in particular, it will be seen that the stop valve handle 56 is generally channel-shaped in elevation and includes a web 58, a first flange 60 and a second flange 62. The web 58 is provided with a centrally located square opening 64 and has in vertical alignment with the opening 64 a cylindrical sleeve 66 for receiving the upper end of the valve stem 42. The interior of the sleeve 66 is provided with a pair of diametrically opposite ribs 67 which are received in diametrically opposite grooves 68 in the valve stem 42 at the upper end thereof. The sleeve 66 is retained in position by a locking screw 70 threadedly carried by the sleeve and extending therethrough.

It will be noted that the first flange 60 is of less height than the second flange 62 and has a small centrally located portion 72 removed therefrom in order to provide a pair of spaced parallel upstanding legs 74. The second flange 62 has a major portion of its central part removed in order to provide two elongated spaced parallel upstanding legs 76, the legs 76 extending above and below the legs 74. The legs 74 have their upper ends bent to form a pair of hinge eyes 78, the purpose of the hinge eyes 78 will be explained in more detail hereinafter.

Referring now to Figure 2 in particular, it will be seen that the mixing valve portion 12 includes a mixing chamber housing 80 in the form of an elongated tubular member which has a threaded upper end 82 and internally threaded lower end 84. The mixing chamber housing 80 is also provided with a pair of diametrically opposite, vertically offset inlet fittings 86 and 88 which are cold and hot water inlets, respectively. It will be noted that the cold water inlet 86 is vertically above the hot water inlet 88, a distance so that the lower extremity of the inlet opening 90 through the wall of the housing 80 is above the plane of the upper extremity of the inlet opening 92 of the hot water inlet. The cold water inlet 86 and the hot water inlet 88 are both threaded internally and having threadedly engaged therein cold and hot water pipes 94 and 96, respectively.

It will be noted that the mixing chamber housing 80 is provided with a hexagonal outer configuration at 98 at its lower end so that the housing 80 may be conveniently gripped by wrench means for threadedly engaging the threaded upper end 82 into the threaded inlet opening 16 of the globe valve housing 14. The upper end 82 of the mixing chamber housing 80 is sealed with respect to the globe housing 14 by an annular packing ring 100 which is compressed against an annular flange 102 disposed within the housing 14.

Disposed within the mixing chamber housing 80 for vertically sliding movement is a mixing valve element 104.

Referring now to Figures 2 and 4 in particular, it will be seen that the mixing valve element 104 is in the form of a thick annular ring 106 having a deep concentric sleeve portion 108 secured thereto by a pair of spokes 110. By spacing the annular ring 106 from the sleeve 108 and connecting the same to the annular ring by the spokes 110, a pair of hot water inlet passages 112 are formed. It will be noted that the depth of the annular ring 106 is greater than the diameter of the cold and hot water inlet openings 90 and 92 whereby either of the openings may be completely closed by the mixing valve element 104.

In order that the lower end 84 of the housing 80 may be closed, a cap bolt 114 is threadedly engaged therein. It will be noted that the cap bolt 114 has a hexagonal head 116 which clamps in the annular sealing ring 118 against the end of the housing 80 when its threaded body portion 120 is threadedly engaged in the end of the housing. The upper end of the body portion 120 of the bolt 114 is in the same horizontal plane as the lower extremity of the hot water inlet opening 92 so as to limit the downward movement of the mixing valve element 104 in a position closing the hot water inlet 92.

The sleeve portion 108 of the mixing valve element 104 is internally threaded as at 122 and has threadedly engaged therein a mixing valve control stem element 124 which is in the form of an elongated circular cross section rod. The control stem 124 is locked in the sleeve 108 by a lock nut 126 threadedly engaged thereon. In order that the control stem 124 may pass through the valve element 40 and its associated valve stem 42 of the stop valve portion 10, the valve element 40 and the valve stem 42 are provided with a continuous centrally located bore 128 therethrough. Since the bolt 54 for retaining the washer 52 in its associated recess 50 is also located centrally of the valve member 40, it has been necessary to provide a special bolt 54 which has a centrally located bore 130 therethrough, the bore 130 being in alignment with the bore 128 but of a slightly smaller diameter. The upper end of the valve stem 42 is threaded as at 132 and has threadedly engaged thereon a packing nut 134 which compresses packing 136 against the upper end of the valve stem 42 and around the control stem 124. In this manner, the bore 128 through the valve stem 42 and the valve element 40 is sealed against the escape of water therethrough.

As is best illustrated in Figures 2 and 10, the control stem 124 is provided with a cotter pin 138 for limiting the upward movement of the control stem 124 whereby the mixing valve 104 completely closes the cold water inlet opening 90 when it is in its uppermost position.

Referring now to Figures 2 and 5 in particular, it will be seen that the control stem 124 is supported intermediate its ends within the mixing valve chamber housing 80 by a guide member 140. The guide member 140 is in the form of a central sleeve 142 having a bore 144 therethrough receiving the control stem 124. The sleeve 142 is positioned on the control stem by a cotter pin 146 passing therethrough. The sleeve 142 is provided with a pair of curved spring arms 148 which have slide elements 150 mounted on their outer ends. The slide elements 150 resiliently engage the inner walls of the mixing chamber housing 80 and are made of rubber, fiber, etc., whereby they will develop friction between themselves and the inner wall of the mixing chamber housing 80 in order to retain the mixing valve element 104 in its adjusted position.

In order that the control stem 124 and its associated mixing valve element 104 may be moved vertically, it is provided with a mixing valve control member 152. The mixing valve control member 152 is in the form of an oval cross sectional tubular member which is pivotally secured at one end to the first flange 60 of the stop valve handle 56 by a cotter pin 154 passing through horizontally aligned apertures in the side walls of the control member and engaging in the hinge eyes 78 of the first flange 60. The apertures in the mixing valve control stem will be referred to by the reference numeral 156. As is best illustrated in Figure 2, the mixing valve control 152 is received between the legs 74 of the first flange 60 and the legs 76 of the second flange 62.

In order that the mixing valve control 152 may receive the upper end of the control stem 124, it is provided with vertically aligned elongated slots 158 in its upper and lower surfaces. The upper end of the control stem 124 is disposed within the tubular mixing valve control member 152 and has mounted thereon a transverse pin 160.

As is best illustrated in Figure 8, the transverse pin 160 includes a central portion 162 and reduced end portions 164. The transverse pin 160 is circular in cross section and has a centrally located aperture 166 therethrough in which is received the upper end of the control stem 124. The transverse pin 160 is located on the control stem 124 by a pair of washers 168 engaging the upper and lower surfaces thereof. The washers 168 being retained in position by cotter pins 170 passing through the control stem 124.

In order that pivotal movement of the mixing valve control member 152 may be translated to vertical movement of the control stem 124, the reduced end portions 164 of the transverse pin 160 have rotatably mounted thereon roller sleeves 172, the sleeves 172 being retained on the reduced end portions 164 by screws 174 threadedly engaged in threaded bores 176 in the ends of the reduced portions 164. As is best illustrated in Figures 2 and 6, the side walls of the tubular mixing valve control member 152 are provided with a pair of horizontally aligned elongated slots 178 in which are rotatably received roller sleeves 172 of the transverse pin 160.

As the mixing valve control member 152 is pivoted about the cotter pin 154, the roller sleeves 172 move longitudinally of the mixing valve control member 152 within the elongated slots 178. This permits the upper end of the control stem 124 to remain in a vertical position and at the same time can be moved vertically with respect to the valve stem 42. It will be seen that the control stem 124 of the mixing valve portions 12 may be moved vertically in order to adjust the mixing valve element 104 without varying the adjustment of the stop valve element 40. Also, the stop valve element may be screwed down until its washer 52 engages the valve seat 20 without varying the adjustment of the mixing valve element 104 as the mixing valve control member 152 is free to pivot and is not forced downwardly as it and its associated stop valve control handle 56 is rotated.

Although the inlet pipes 94 and 96 have been designated as cold and hot water inlet pipes, respectively, it will be understood that they may be reversed and the mixing valve will function in the same manner. Also, while the mixing valve is intended primarily for use in a shower construction, it will be readily apparent that the combined stop and mixing valve may utilize any type of fixture where it is desired to have a constant stream of water whose temperature may be varied and remain constant after being adjusted. Stop and mixing valve may be utilized in any plumbing fixture where it is desirable to have a stream of water of adjustable temperature.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. A mixing valve comprising a mixing chamber, said mixing chamber having hot and cold inlet pipes, said inlet pipes being diametrically opposed and vertically spaced, a valve element vertically slideable within said mixing chamber for selectively closing said inlet pipes, said mixing chamber being in the form of a tubular member closed at one end and threaded at the other end, a shut-off valve, said threaded end being in engagement with one end of said shut-off valve, said shut-off valve including a valve stem having a valve member carried at the lower end thereof, said valve member being above said valve element, an outlet port above said valve member, said valve member controlling flow through said outlet port, said valve element of the mixing chamber having a stem co-axial with the valve stem of said shut-off valve and vertically slideable therethrough.

2. A mixing valve comprising a mixing chamber, said mixing chamber having hot and cold inlet pipes, said inlet pipes being diametrically opposed and vertically spaced, a valve element vertically slideable within said mixing chamber for selectively closing said inlet pipes, said mixing chamber being in the form of a tubular member closed at one end and threaded at the other end, a shut-off valve, said threaded end being in engagement with one end of said shut-off valve, said shut-off valve including a valve stem having a valve member carried at the lower end thereof, said valve member being above said valve element, an outlet port above said valve member, said valve member controlling flow through said outlet port, said valve element of the mixing chamber having a stem co-axial with the valve stem of said shut-off valve and vertically slideable therethrough, said shut-off valve being operable without disturbing the setting of the mixing valve.

3. A mixing valve comprising a mixing chamber, said mixing chamber having hot and cold inlet pipes, said inlet pipes being diametrically opposed and vertically spaced, a valve element vertically slideable within said mixing chamber for selectively closing said inlet pipes, said mixing chamber being in the form of a tubular member closed at one end and threaded at the other end, a shut-off valve, said threaded end being in engagement with one end of said shut-off valve, said shut-off valve including a valve stem having a valve member carried at the lower end thereof, said valve member being above said valve element, an outlet port above said valve member, said valve member controlling flow through said outlet port, said valve element of the mixing chamber having a stem co-axial with the valve stem of said shut-off valve and vertically slideable therethrough, said stem of the mixing valve being provided with a spring guide slideably engaging the inner wall of the mixing chamber.

4. A mixing valve comprising a mixing chamber, said mixing chamber having hot and cold inlet pipes, said inlet pipes being diametrically opposed and vertically spaced, a valve element vertically slideable within said mixing chamber for selectively closing said inlet pipes, said mixing chamber being in the form of a tubular member closed at one end and threaded at the other end, a shut-off valve, said threaded end being in engagement with one end of said shut-off valve, said shut-off valve including a valve stem having a valve member carried at the lower end thereof, said valve member being above said valve element, an outlet port above said valve member, said valve member controlling flow through said outlet port, said valve element of the mixing chamber having a stem co-axial with the valve stem of said shut-off valve and vertically slideable therethrough, means carried by said mixing valve stem engageable with said shut-off valve for limiting the vertical movement of said valve element of the mixing chamber.

5. A mixing valve comprising a mixing chamber, said mixing chamber having hot and cold inlet pipes, said inlet pipes being diametrically opposed and vertically spaced, a valve element vertically slideable within said mixing chamber for selectively closing said inlet pipes, said mixing chamber being in the form of a tubular member closed at one end and threaded at the other end, a shut-off valve, said threaded end being in engagement with one end of said shut-off valve, said shut-off valve including a valve stem having a valve member carried at the lower end thereof, said valve member being above said valve element, an outlet port above said valve member, said valve member controlling flow through said outlet port, said valve element of the mixing chamber having a stem co-axial with the valve stem of said shut-off valve and vertically slidable therethrough, single actuating means for said valve stems.

6. A mixing valve comprising a mixing chamber, said mixing chamber having hot and cold inlet pipes, said inlet pipes being diametrically opposed and vertically spaced, a valve element vertically slideable within said mixing chamber for selectively closing said inlet pipes, said mixing chamber being in the form of a tubular member closed at one end and threaded at the other end for engagement with an inlet end of a shut-off valve of the type having inlet and outlet ports, said valve member of the mixing chamber having a stem co-axial with a valve stem of the shut-off valve and slidable therethrough, single actuating means for said valve stems, said actuating means including a handle rigidly carried by said shut-off valve stem, a control member pivotally carried by said handle, said control member being connected to said stem for controlling said mixing chamber, said control member being rotatable horizontally for controlling said shut-off valve to control flow through the outlet port and vertically for controlling flow into said mixing chamber.

References Cited in the file of this patent

UNITED STATES PATENTS

| | | |
|---|---|---|
| 147,065 | Nutty | Feb. 3, 1874 |
| 531,585 | Cole | Dec. 25, 1894 |
| 742,327 | Huye | Oct. 27, 1903 |
| 925,436 | Kenly | June 15, 1909 |
| 949,056 | Brand | Feb. 15, 1910 |
| 1,611,294 | Von Ende | Dec. 21, 1926 |
| 1,964,836 | Wheaton | July 3, 1934 |
| 2,373,702 | Moen | Apr. 17, 1945 |
| 2,596,464 | Bauberger | May 13, 1952 |

FOREIGN PATENTS

| | | |
|---|---|---|
| 55,884 | Denmark | 1939 |